United States Patent
Sun et al.

(10) Patent No.: US 8,797,860 B2
(45) Date of Patent: Aug. 5, 2014

(54) METHOD FOR IMPLEMENTING FLOW CONTROL IN SWITCH FABRIC, SWITCHING DEVICE, AND SWITCHING SYSTEM

(75) Inventors: Tuanhui Sun, Beijing (CN); Defeng Li, Beijing (CN); Hao Su, Shenzhen (CN); Aijuan Cao, Beijing (CN); Jian Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 13/589,890

(22) Filed: Aug. 20, 2012

(65) Prior Publication Data

US 2012/0314577 A1 Dec. 13, 2012

Related U.S. Application Data

(63) Continuation of application No. PCT/CN2010/076746, filed on Sep. 9, 2010.

(30) Foreign Application Priority Data

Feb. 20, 2010 (CN) .......................... 2010 1 0113687

(51) Int. Cl.
*H04L 12/26* (2006.01)
*H04L 12/28* (2006.01)
*H04L 12/56* (2006.01)

(52) U.S. Cl.
CPC .............. *H04L 47/12* (2013.01); *H04L 49/552* (2013.01); *H04L 47/26* (2013.01); *H04L 49/506* (2013.01); *H04L 49/3027* (2013.01)
USPC .......................................... 370/230; 370/412

(58) Field of Classification Search
USPC ................................... 370/229–235, 412–418
See application file for complete search history.

(56) References Cited

U.S. PATENT DOCUMENTS

| | | | |
|---|---|---|---|
| 6,201,792 | B1 | 3/2001 | Lahat |
| 6,519,225 | B1 | 2/2003 | Angle et al. |

(Continued)

FOREIGN PATENT DOCUMENTS

| | | | |
|---|---|---|---|
| CN | 1551564 A | 12/2004 | |
| CN | 1816016 A | 8/2006 | |

(Continued)

OTHER PUBLICATIONS

Office Action dated Mar. 13, 2013 in connection with Chinese Patent Application No. 201010113687.1.

(Continued)

*Primary Examiner* — Hong Cho

(57) ABSTRACT

A method for implementing flow control in a switch fabric includes: sending, by each input port, request information to a destination output port where no packet congestion occurs; according to respective back pressure information, determining, by the destination output port which receives the request information, whether to return grant information to each input port to establish a matching relationship between each input port and the destination output port which returns the grant information; according to the matching relationship, scheduling, by each input port, a cell to a destination output port that is matched with each input port. Through the embodiments of the present invention, quantity of information transmitted between an input port and an output port is reduced, the design of the switch fabric is simplified, and data processing efficiency in the switch fabric is improved.

18 Claims, 4 Drawing Sheets

---

Each input port sends request information to a destination output port where no packet congestion occurs — 101

According to respective back pressure information, the destination output port which receives the request information determines whether to return grant information to each input port to establish a matching relationship between each input port and the destination output port which returns the grant information — 102

According to the matching relationship, each input port schedules a cell to a destination output port that is matched with each input port — 103

(56) References Cited

U.S. PATENT DOCUMENTS

| | | |
|---|---|---|
| 6,636,510 B1 | 10/2003 | Lee et al. |
| 6,721,273 B1 * | 4/2004 | Lyon ............................. 370/235 |
| 6,771,596 B1 | 8/2004 | Angle et al. |
| 6,954,811 B2 * | 10/2005 | Vishnu ........................... 710/113 |
| 7,023,840 B2 * | 4/2006 | Golla et al. .................... 370/360 |
| 7,068,672 B1 * | 6/2006 | Jones ............................ 370/412 |
| 7,120,117 B1 | 10/2006 | Liu et al. |
| 7,151,744 B2 * | 12/2006 | Sarkinen et al. ............... 370/230 |
| 7,782,780 B1 * | 8/2010 | Gibson .......................... 370/235 |
| 2001/0021174 A1 * | 9/2001 | Luijten et al. ................. 370/229 |
| 2004/0017804 A1 * | 1/2004 | Vishnu .......................... 370/386 |
| 2004/0213217 A1 | 10/2004 | Willhite et al. |
| 2005/0002334 A1 * | 1/2005 | Chao et al. .................... 370/230 |
| 2006/0176894 A1 | 8/2006 | Oh et al. |
| 2006/0291458 A1 | 12/2006 | Liu et al. |
| 2007/0237082 A1 * | 10/2007 | Han .............................. 370/235 |
| 2008/0253199 A1 * | 10/2008 | Torabi et al. ............. 365/189.05 |
| 2010/0002716 A1 * | 1/2010 | Naven et al. .................. 370/419 |
| 2010/0316061 A1 * | 12/2010 | Rojas-Cessa et al. ........ 370/417 |

FOREIGN PATENT DOCUMENTS

| | | |
|---|---|---|
| CN | 101340393 A | 1/2009 |
| EP | 1052816 A2 | 11/2000 |

OTHER PUBLICATIONS

Written Opinion dated Dec. 16, 2010 in connection with International Patent Application No. PCT/CN2010/076746, 3 pages.

Extended European Search dated Nov. 2, 2012 in connection with European Patent Application 10846000.7, 9 pages.

International Search Report dated Dec. 16, 2010 in connection with International Patent Application No. PCT/CN2010/076746.

\* cited by examiner

METHOD FOR IMPLEMENTING FLOW CONTROL IN SWITCH FABRIC, SWITCHING DEVICE, AND SWITCHING SYSTEM

CROSS-REFERENCE TO RELATED APPLICATIONS

This application is a continuation of International Application No. PCT/CN2010/076746, filed on Sep. 9, 2010, which claims priority to Chinese Patent Application No. 201010113687.1, filed on Feb. 20, 2010, both of which are hereby incorporated by reference in their entireties.

TECHNICAL FIELD

The embodiments of the present invention relate to the field of communication technologies, and in particular, to a method for implementing flow control in a switch fabric, a switching device, and a switching system.

BACKGROUND

In a switch fabric with combined input-output queued (hereinafter referred to as CIOQ) architecture, a variable-length packet received by a line card is split into cells with a fixed length that are buffered at an input end to form a queue. At the input end, N (N is a positive integer) unicast virtual output queues (hereinafter referred to as VOQs) and k (k is a positive integer, and $1 \leq k \leq 2^N$) multicast VOQs are set. Queue scheduling time is split into time slots with a fixed length. Within one time slot, one input port can send at most one cell, and one output port can receive at most one cell. When multiple input ports need to send data to the same output port at the same time within one time slot, a port conflict occurs.

When a multicast packet is queued in a multicast VOQ according to a data flow, since the number $2^N$ of multicast data flows is much greater than the number k of multicast VOQs, a phenomenon that multiple multicast data flows are queued in the same multicast VOQ inevitably occurs. Cells belonging to different packets are interleaved in the multicast VOQ. That is, for one multicast VOQ, several cells belonging to one multicast packet are continuously queued, closely followed by several cells belonging to another multicast packet being queued. The preceding phenomenon inevitably causes a severe head of line blocking phenomenon in multicast scheduling. In order to avoid the head of line blocking phenomenon that data at the head of the queue cannot be scheduled and consequently all data at the tail of the queue cannot be scheduled, generally a fan-out split method is used in the multicast scheduling.

In the prior art, a multiple iteration method is used in a flow control mechanism in a switch fabric to match an input port and an output port. If congestion occurs at an output queue of the switch fabric, since the output port cannot receive more data, the output port sends flow control information to the input port. A switch fabric scheduling algorithm matches the input port and the output port. Before the input port sends data to the output port, the output port where congestion occurs is filtered first.

In a switch fabric in the prior art, a switch fabric bandwidth needs to be occupied when an output port sends flow control information to an input port, and therefore, a burden of the switch fabric is increased.

SUMMARY

In order to improve data processing efficiency in a switch fabric, embodiment of the present invention provide a method for implementing flow control in a switch fabric, a switching device, and a switching system.

An embodiment of the present invention provides a method for implementing flow control in a switch fabric, which includes:

sending, by each input port, request information to a destination output port where no packet congestion occurs;

according to respective back pressure information, determining, by the destination output port which receives the request information, whether to return grant information to each input port to establish a matching relationship between each input port and the destination output port which returns the grant information; and according to the matching relationship, scheduling, by each input port, a cell to a destination output port that is matched with each input port.

An embodiment of the present invention further provides a switching device, which includes an input port processing module, an output port processing module, an arbitration module and a crossbar module.

The input port processing module is configured to send request information received from each input port to the arbitration module.

The output port processing module is configured to send back pressure information received from each output port to the arbitration module.

The arbitration module is configured to, according to the request information and the back pressure information, establish a matching relationship between each input port and a destination output port which returns grant information to each input port.

The crossbar module is configured to, according to the matching relationship, schedule a data cell of each input port to a destination output port matched with each input port.

An embodiment of the present invention further provides a switching system, which includes an uplink queue management device and a downlink queue management device which are configured to schedule a data cell. The switching system further includes at least one switching device as described in the preceding. The uplink queue management device is connected to the input port processing module. The downlink queue management device is connected to the output port processing module.

With the method for implementing flow control in a switch fabric, the switching device, and the switching system which are provided in the embodiments of the present invention, since an output port returns grant information with reference to back pressure information to an input port which sends request information, an output port where packet congestion occurs does not need to return flow control information to the input port which sends the request information, so that quantity of information transmitted between the input port and the output port is reduced, and data processing efficiency in the switch fabric is improved.

BRIEF DESCRIPTION OF THE DRAWINGS

To describe the technical solutions in the embodiments of the present invention or in the prior art more clearly, the accompanying, drawings required for describing the embodiments or the prior art are introduced briefly in the following. Apparently, the accompanying drawings in the following description are only some embodiments of the present invention, and persons of ordinary skills in the art may also derive other drawings from these accompanying drawings without creative efforts.

DETAILED DESCRIPTION

The technical solutions in the embodiments of the present invention are clearly and completely described in the following with reference to the accompanying drawings in the embodiments of the present invention. Apparently, the embodiments to be described are only a part rather than all of the embodiments of the present invention. Based on the embodiments of the present invention, all other embodiments obtained by persons of ordinary skills in the art without creative efforts shall fall within the protection scope of the present invention.

A network device with a switch fabric function needs to divide a packet into multiple cells with a fixed length when forwarding the packet. Different cells of the same packet are scheduled at the same input port. One cell is scheduled within one time slot. The same input port may maintain cells of packets to be sent to multiple output ports. Each cell belonging to the same packet needs to be switched to the same destination output port. Each cell belonging to different packets may need to be switched to the same destination output port, or may need to be switched to different destination output ports. Before cell switching, queue status information of each input port and back pressure information of a destination output port that is corresponding to each input port need to be obtained.

Figure 1:
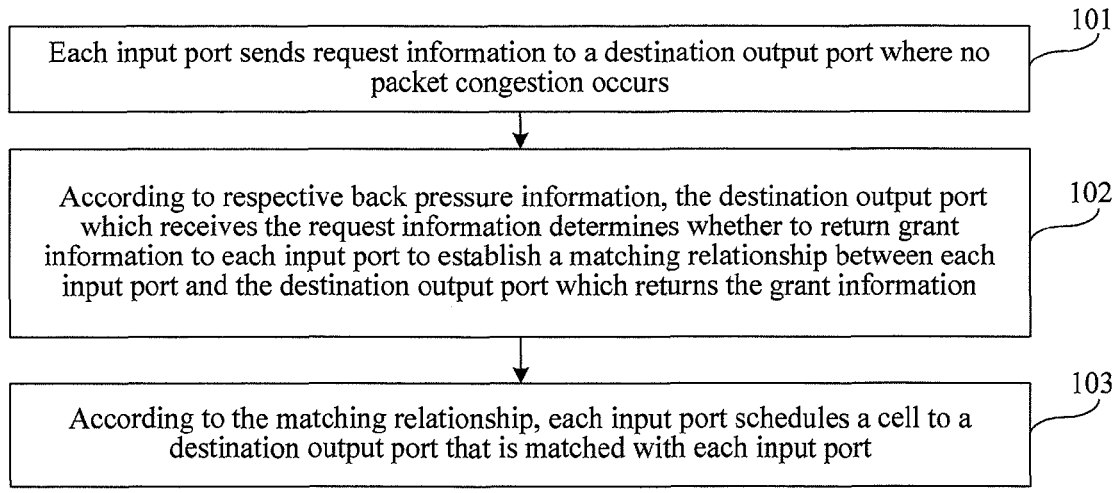
FIG. 1 is a schematic flow chart of a method for implementing flow control in a switch fabric according to an embodiment of the present invention.

FIG. 1 is a schematic flow chart of a method for implementing flow control in a switch fabric according to an embodiment of the present invention. Referring to FIG. 1, the embodiment of the present invention includes the following steps.

Step 101: Each input port sends request information to a destination output port where no packet congestion occurs.

Step 102: According to respective back pressure information, the destination output port which receives the request information determines whether to return grant information to each input port to establish a matching relationship between each input port and the destination output port which returns the grant information.

Step 103: According to the matching relationship, each input port schedules a cell to a destination output port that is matched with each input port.

With the method for implementing flow control in a switch fabric provided in this embodiment of the present invention, since each input port only sends request information to the destination output port where no packet congestion occurs, with reference to back pressure information, the output port determines whether to return grant information to the input port which sends the request information, and therefore, the output port where packet congestion occurs does not need to return flow control information to the input port which sends the request information, so that quantity of information transmitted between the input port and the output port is reduced, the design of the switch fabric is simplified, and data processing efficiency in the switch fabric is improved.

Figure 2:
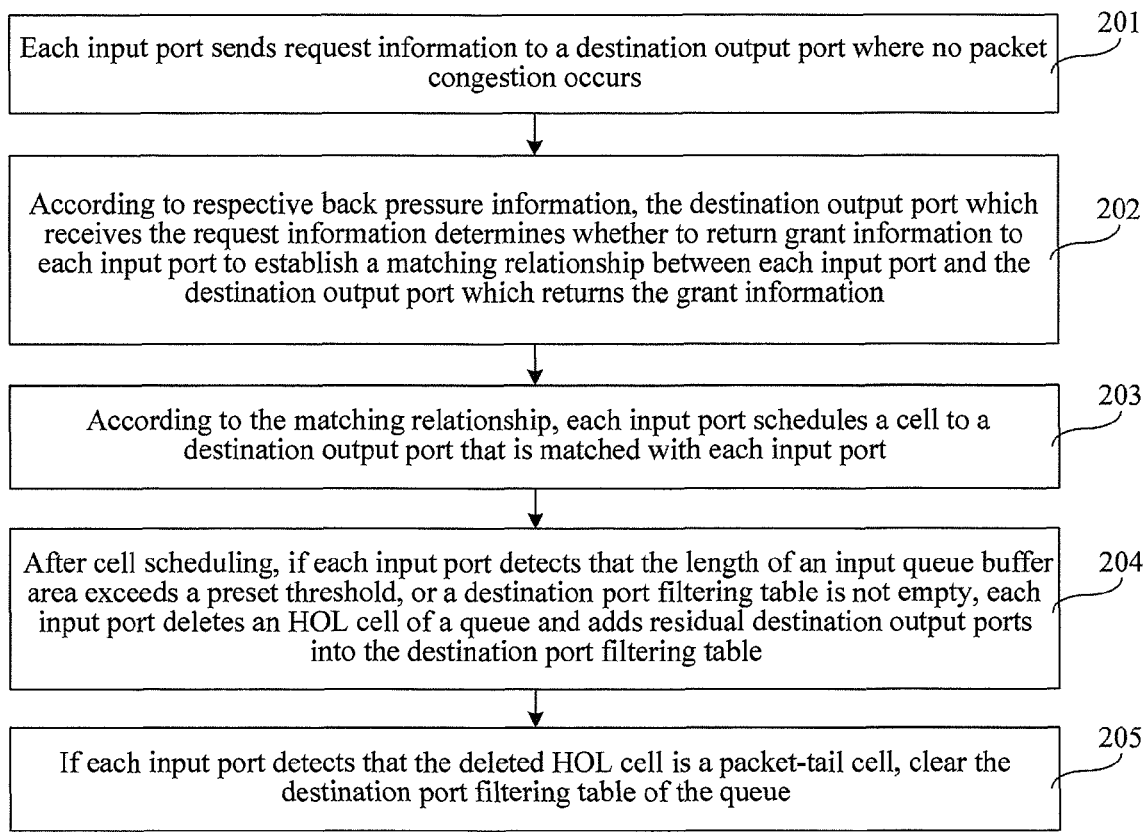
FIG. 2 is a schematic flow chart of a method for implementing flow control in a switch fabric according to another embodiment of the present invention.

FIG. 2 is a schematic flow chart of a method for implementing flow control in a switch fabric according to another embodiment of the present invention. Referring to FIG. 2, the embodiment of the present invention includes the following steps.

Step 201: Each input port sends request information to a destination output port where no packet congestion occurs.

When each input port sends the request information, the destination output port where congestion occurs is filtered according to a destination port filtering table of each queue at the port. The destination port filtering table is used for recording whether packet congestion occurs at the destination output port. Specifically, if the queue is a unicast queue, there is at most one destination output port in the destination port filtering table. When unicast cell request information is sent, after the filtering by the destination port filtering table, the input port may not need to send the request information of the unicast queue again. If the queue is a multicast queue, the destination port filtering table includes multiple destination ports. When a multicast cell sends request information, after the filtering by the destination port filtering table, the input port may still send the request information of the multicast queue to multiple destination output ports.

Step 202: According to respective back pressure information, the destination output port which receives the request information determines whether to return grant information to each input port to establish a matching relationship between each input port and the destination output port which returns the grant information.

Each output port obtains a congestion status of the port. When the destination output port receives the request information of the input port, the destination output port where congestion occurs no longer sends grant information to any input port. Specifically, with reference to the back pressure information, each output port determines whether congestion occurs at the output port. If the back pressure information is set, it represents that the output port is in a congestion status and does not return the grant information to the input port which sends the request information. If the back pressure information is not set, it represents that the output port may receive a cell sent by the input port, so that the output port may return the grant information to the input port which sends the request information.

Step 203: According to the matching relationship, each input port schedules a cell to a destination output port that is matched with each input port.

If the cell is a multicast cell, each input port sends the multicast cell by using a fan-out split method to the destination output port which establishes the matching relationship, updates a destination port table of a head of line (HOL) cell of the multicast queue, and deletes the destination output port to which a cell copy has been sent. If the destination port table of the HOL cell of the multicast queue is empty, each input port deletes the HOL cell of the multicast queue.

If the cell is a unicast cell, each input port sends a unicast cell copy to the destination output port which establishes the matching relationship, and deletes an HOL cell of the unicast queue.

Step 204: After cell scheduling, if each input port detects that the length of an input queue buffer area exceeds a preset threshold, or the destination port filtering table is not empty, each input port deletes the HOL cell of the queue and adds residual destination output ports into the destination port filtering table.

Specifically, each input port updates the destination port table of the HOL cell of the multicast queue according to the destination port filtering table of the multicast queue, deletes an output port where congestion occurs from the destination port table of the HOL cell according to the destination port filtering table, so that each input port no longer sends the request information to the destination output port where congestion occurs, and also no longer schedules a cell to the output port where congestion occurs, thus avoiding that the congestion status of the output port where congestion occurs becomes worse.

Step 205: If each input port detects that the deleted HOL cell is a packet-tail cell, clear the destination port filtering table of the queue.

When the output port re-organizes a packet, if a cell in the same packet is lost, the whole packet is discarded due to a reorganization failure, and therefore, a cell needs to be discarded based on a packet. That is, the input port clears the destination port filtering table of a queue that belongs to the same packet only when the input port detects that the cell being deleted is a packet-tail cell.

There is no time sequence between step 204 and step 205, so that a switching device may perform the steps according to an actual situation of a scheduled packet. Furthermore, step 204 or step 205 may also not be performed if a condition for performing step 204 or 205 is not satisfied.

Furthermore, if each input port maintains more than one queue, according to an order of cells in the packet, each input port continuously queues received cells belonging to the same packet in the same queue.

With the method for implementing flow control in a switch fabric provided in this embodiment of the present invention, since each input port only sends request information to the destination output port where no packet congestion occurs, with reference to back pressure information, the output port determines whether to return grant information to the input port which sends the request information, and therefore, the output port where packet congestion occurs does not need to return flow control information to the input port which sends the request information, so that quantity of information transmitted between the input port and the output port is reduced, the design of the switch fabric is simplified, data processing efficiency in the switch fabric is improved, and furthermore, a problem that low efficiency of multicast scheduling is caused by multicast head of line blocking is avoided.

Figure 3:
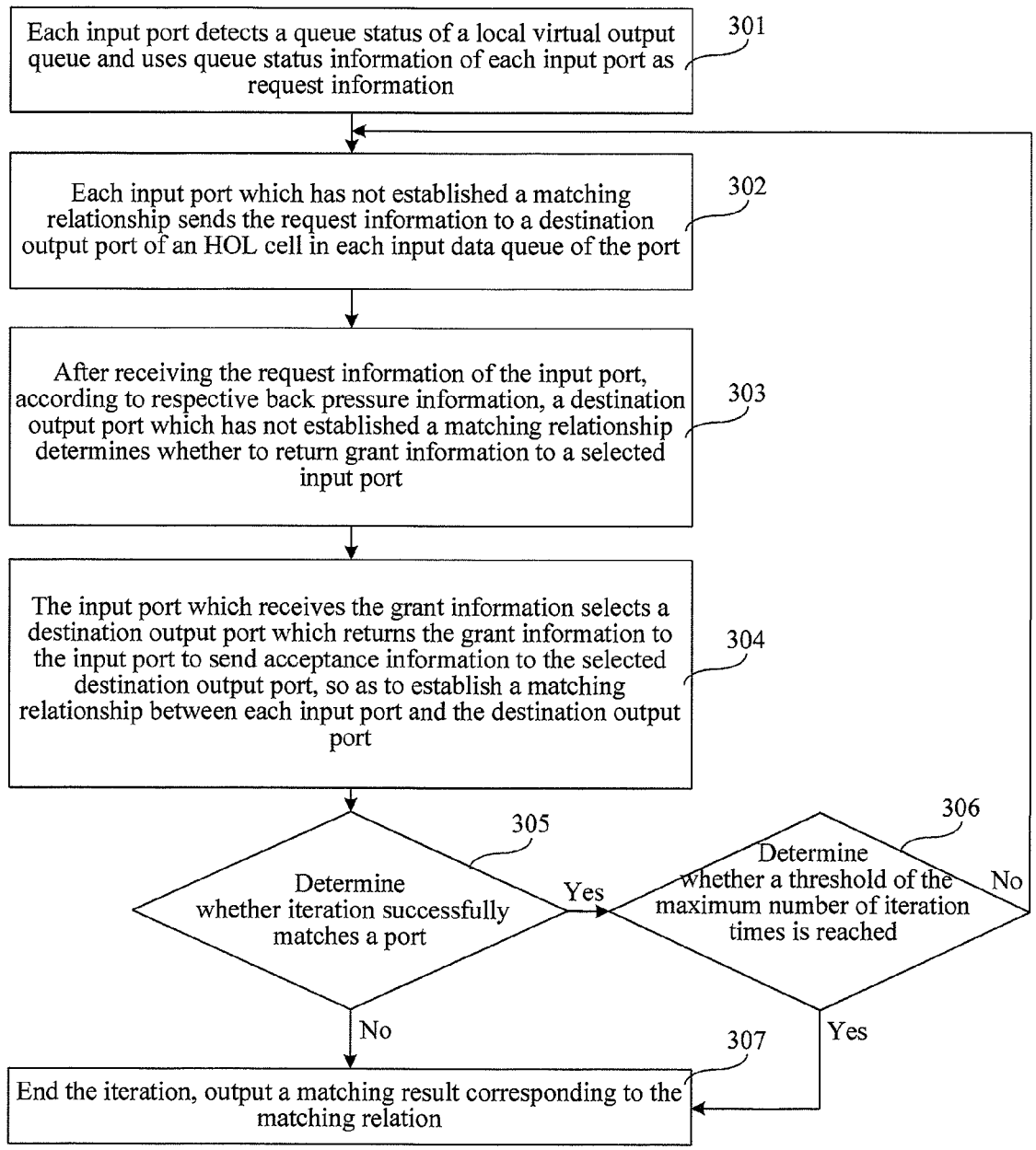
FIG. 3 is a schematic flow chart of establishing a matching relationship applicable to an embodiment of the present invention.

In order to facilitate understanding of the technical solutions provided in the embodiment of the present invention, FIG. 3 is a schematic flow chart of establishing a matching relationship applicable to an embodiment of the present invention. As shown in FIG. 3, after an input port receives a data cell, a process of establishing a matching relationship between each input port and each output port specifically includes the following steps.

Step 301: Each input port detects a queue status of a local virtual output queue and uses queue status information of each input port as request information.

Step 302: Each input port which has not established a matching relationship sends the request information to a destination output port of an HOL cell in each input data queue of the port.

When each input port sends the request information, a destination output port where congestion occurs is filtered according to a destination port filtering table of each queue. The destination port filtering table is used for recording whether packet congestion occurs at the destination output port. Specifically, if the queue is a unicast queue, there is one destination output port in the destination port filtering table. If the queue is a multicast queue, the destination port filtering table includes multiple destination ports. When a multicast cell sends request information, after filtered by the destination port filtering table, each input port may still send the request information to multiple destination output ports.

Step 303: After receiving the request information of the input port, according to respective back pressure information, a destination output port which has not established a matching relationship determines whether to return grant information to a selected input port.

Each output port obtains a congestion status of the port. After the destination output port receives the request information of the input port, the destination output port where congestion occurs no longer sends grant information to any input port. Specifically, with reference to back pressure information, each output port determines whether congestion occurs at the output port. If the back pressure information is set, it represents that the output port is in a congestion status and does not return the grant information to the input port which sends the request information. If the back pressure information is not set, it represents that the output port may receive a cell sent by the input port, so that by using a polling matching method, the output port may select an input port which sends the request information to the output port to return the grant information to the selected input port.

Step 304: The input port which receives the grant information selects a destination output port which returns the grant information to the input port to send acceptance information to the selected destination output port, so as to establish a matching relationship between each input port and the destination output port.

Step 305: Determine whether iteration successfully matches a port. If a determination result is no, it indicates that the maximum match has been established, and step 307 is performed. If the determination result is yes, step 306 is performed.

Step 306: Determine whether the number of iteration times has reached a threshold of the maximum number of iteration times. If a determination result is yes, step 307 is performed. If the determination result is no, step 302 is continued to be performed.

Step 307: End the iteration and output a matching result corresponding to the matching relationship.

The threshold of the maximum number of iteration times is a preset value in a switch fabric. Through the threshold, cyclic iteration in the switch fabric may be controlled to obtain the number of matching information times. If the number of iteration times is equal to the threshold, the iteration is end. If the number of iteration times is not equal to the threshold, step 302 needs to be re-performed until the maximum matching relationship is established.

Through the preceding process, the matching relationship between each input port and each output port may be established. According to the matching relationship, each input port may schedule a cell to a destination output port matched with each input port.

Figure 4:
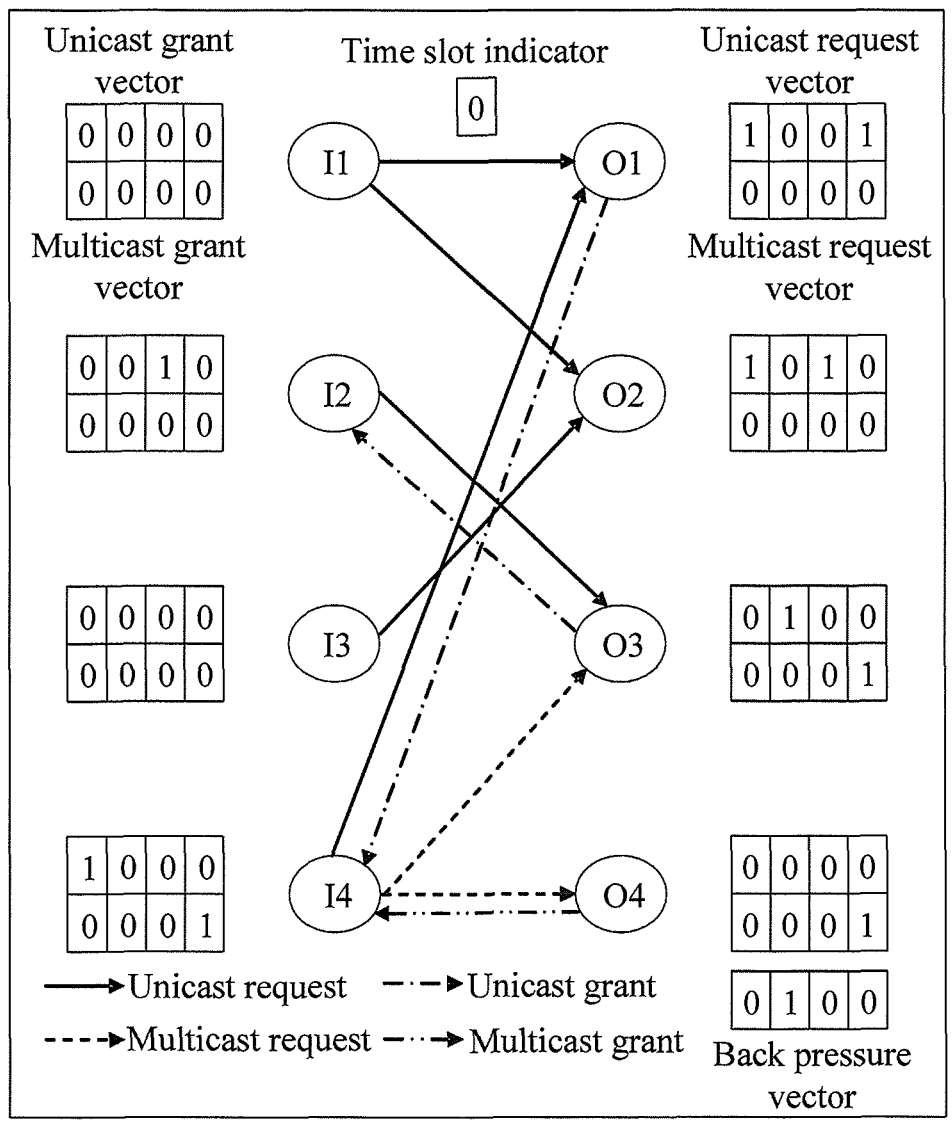
FIG. 4 is a schematic diagram of sending information by an input port and an output port according to an embodiment shown in FIG. 3.

In order to understand the flow chart of the method described in FIG. 3 more clearly, FIG. 4 is a schematic diagram of sending information by an input port and an output port according to an embodiment in FIG. 3. In a switch fabric, an input end has multiple input ports, and an output end has multiple output ports. In this embodiment of the present invention, to facilitate description, as shown in FIG. 4, an example that the number of input ports and the number of output ports are respectively four is taken for description. However, the specific number does not intent to limit the embodiments of the present invention. Specifically, as shown in FIG. 4, each input port (I1, I2, I3, and I4) maintains two grant vectors, and the two grant vectors are respectively a unicast grant vector and a multicast grant vector. The unicast grant vector is used for indicating that received grant information is grant information of a unicast queue. The multicast vector is used for indicating that the received grant information is grant information of a multicast queue. Each output port (O1, O2, O3, and O4) maintains two request vectors, and the two request vectors are respectively a unicast request vector and a multicast request vector. The unicast request vector is used for indicating that received request information is request information of a unicast queue. The multicast request vector is used for indicating that the received request information is request information of a multicast queue. A time slot indicator identifies the type of a current time slot. 0 represents a unicast time slot, and in the unicast time slot, a unicast queue is scheduled preferentially. 1 represents a multicast time slot, and in the multicast time slot, a multicast queue is scheduled preferentially. Definitely, 1 may also represent a unicast time slot, and 0 may represent a multicast time slot.

Before a matching relationship is established, first queue status information of each input port is obtained as request information. Each output port sends grant information with reference to back pressure information. Specifically, if packet congestion occurs at an output port, a back pressure signal exists at the output port, and with reference to the back pressure signal, the output port may determine whether to return grant information to the input port which sends the request information. As shown in FIG. 4, in this embodiment of the present invention, the back pressure information may be implemented through a back pressure vector. If the back pressure vector in the time slot is 1, it represents that the back pressure information is set, a back pressure signal exists at the output port, and packet congestion occurs at the output port. If the back pressure vector in the time slot is 0, it represents that the back pressure information is not set, no back pressure signal exists at the output port, and the output port may return the grant information to the input port.

Figure 5:
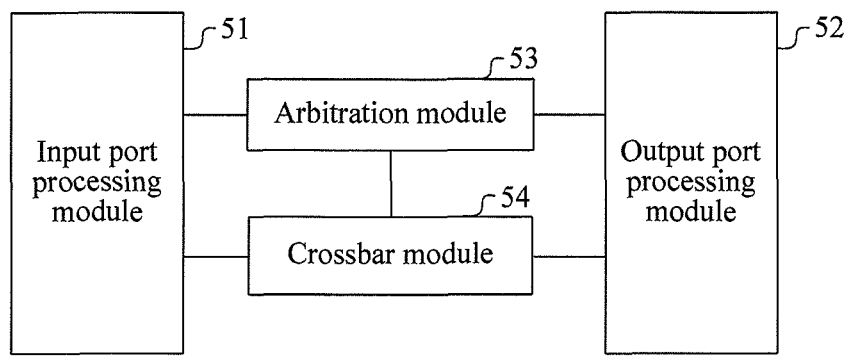
FIG. 5 is a schematic structural diagram of a switching device according to an embodiment of the present invention.

FIG. 5 is a schematic structural diagram of a switching device according to an embodiment of the present invention. As shown in FIG. 5, the embodiment of the present invention includes an input port processing module 51, an output port processing module 52, an arbitration module 53, and a crossbar module 54.

The input port processing module 51 sends request information received from each input port to the arbitration module 53. The output port processing module 52 sends back pressure information received from each output port to the arbitration module 53. According to the request information and the back pressure information, the arbitration module 53 establishes a matching relationship between each input port and a destination output port which returns grant information to each input port. According to the matching relationship established by the arbitration module 53, the crossbar module 54 schedules a data cell of each input port to a destination output port matched with each input port.

With a cell switching device provided in this embodiment of the present invention, with reference to the request information of the input port processing module 51 and the back pressure information of the output port processing module 52, the arbitration module 53 establishes the matching relationship between each input port and the destination output port which returns the grant information to each input port, and therefore, an output port where packet congestion occurs does not need to send flow control information to the input port which sends the request information, so that quantity of information transmitted between the input port and the output port is reduced, the design of a switch fabric is simplified, and data processing efficiency in the switch fabric is improved.

Furthermore, based on the embodiment shown in FIG. 5, when the input port processing module 51 obtains a destination output port of an HOL cell in each data input queue of the port, and sends the request information to the destination output port, the input port processing module 51 is further configured to filter a destination output port where congestion occurs according to a destination port filtering table of each queue. The destination port filtering table is used for recording whether packet congestion occurs at the destination output port.

Furthermore, the input port processing module 51 is further configured to send a multicast cell copy by using a fan-out split method to the destination output port which establishes the matching relationship, update a destination port table of an HOL cell of a multicast queue, and delete a destination output port to which a cell copy has been sent. If the destination port table of the HOL cell of the multicast queue is empty, the HOL cell of the multicast queue is deleted. The input port processing module 51 is further configured to delete an HOL cell of a unicast queue after sending a unicast cell copy to the destination output port which establishes the matching relationship.

Furthermore, the input port processing module 51 is further configured to, after cell scheduling; if it is detected that the length of an input queue buffer area exceeds a preset threshold, delete the HOL cell of the queue, and add residual destination output ports into the destination port filtering table.

If it is detected that the deleted HOL cell of the queue is a packet-tail cell, the input port processing module 51 is further configured to clear the destination port filtering table of the queue.

The input port processing module 51 is further configured to maintain multiple queues, and according to an order of cells in the packet, continuously queue received cells that belong to the same packet in the same queue.

In addition, the arbitration module 53 is further disposed with a time slot indicator. The time slot indicator is configured to indentify the type of a current time slot. If the current time slot is a unicast time slot, unicast data is scheduled preferentially. If the current time slot is a multicast time slot, multicast data is scheduled preferentially.

Figure 6:
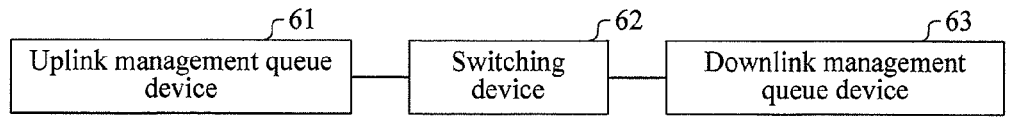
FIG. 6 is a schematic structural diagram of a switching system according to an embodiment of the present invention.
Figure 7:
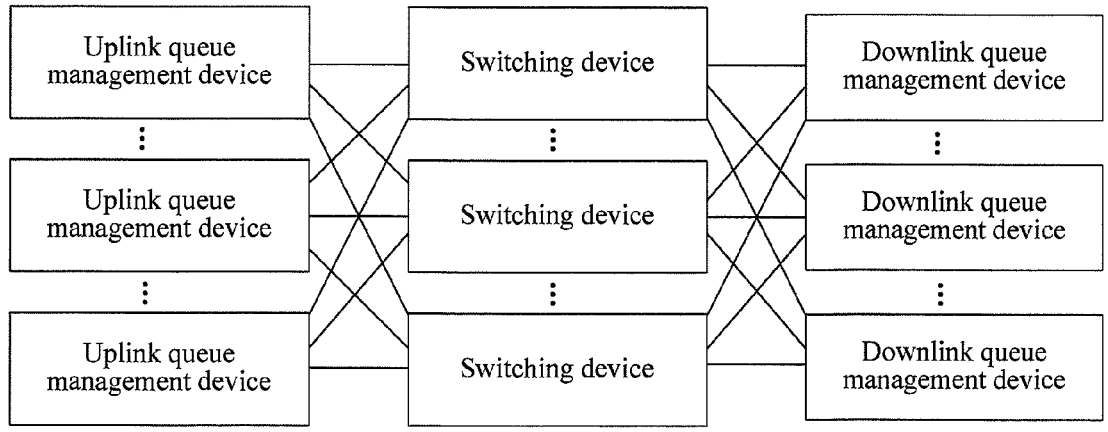
FIG. 7 is a schematic structural diagram of a switching system according to another embodiment of the present invention.

FIG. 6 is a schematic structural diagram of a switching system according to an embodiment of the present invention. As shown in FIG. 6, the embodiment of the present invention includes an uplink queue management device 61, a switching device 62, and a downlink queue management device 63. FIG. 6 merely shows a scenario where a switching system has one switching device. FIG. 7 is a schematic structural diagram of a switching system according to another embodiment of the present invention. This embodiment further includes a scenario where a switching system includes multiple switching devices. As shown in FIG. 7, the system includes multiple switching devices and accordingly includes multiple uplink queue management devices and multiple downlink queue management devices. The uplink queue management devices are respectively connected to an input port processing module in each switching device. The downlink queue management devices are respectively connected to output port processing modules. For architecture of the switching system where the switching system includes only one switching device, reference may be made to the description of the embodiment shown in FIG. 5. In this embodiment, the uplink queue management device and the downlink queue management device may be set as two independent devices or integrally set in one queue management device.

When the switching system includes multiple switching devices, in order to reduce the complexity of reorganizing a packet in the downlink queue management device, different cells belonging to the same packet are required to be switched in the same switching device. A specific switching process may refer to the description of the embodiments shown in FIG. 1 to FIG. 3, which is not described in detail here.

Figure 8:
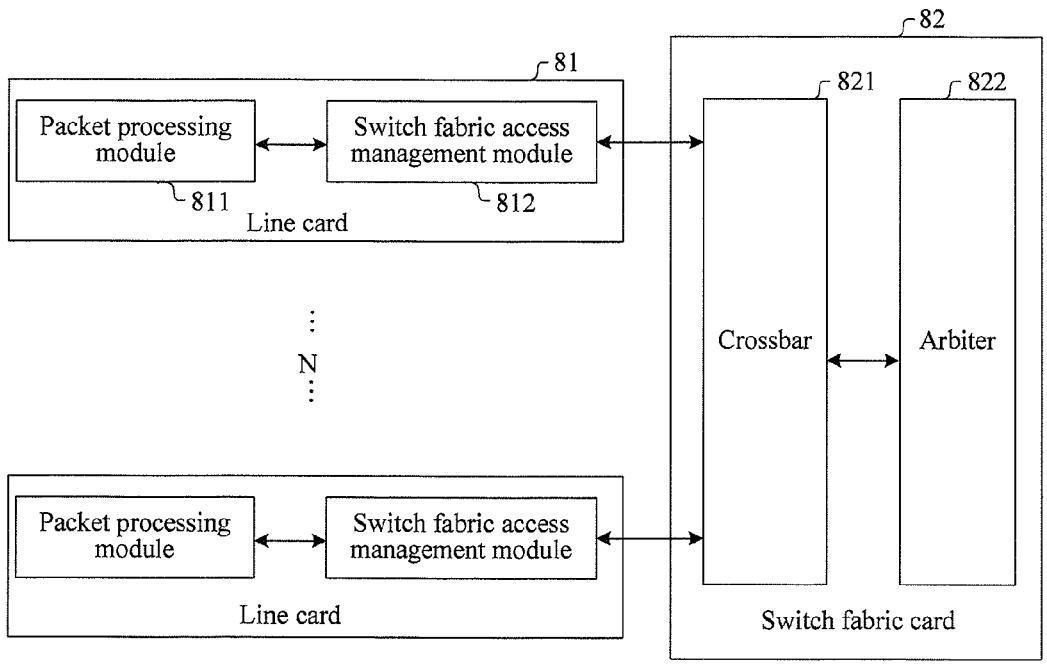
FIG. 8 is a schematic structural diagram of a system applicable to an embodiment of the present invention.

FIG. 8 is a schematic structural diagram of a system applicable to an embodiment of the present invention. As shown in FIG. 8, the system includes N line cards 81 and a switch fabric card 82. The line card 81 may further include a packet processing module 811 and a switch fabric access management module 812. The switch fabric access management module 812 is responsible for maintaining a local buffered cell queue, and at the same time reporting a status of the cell queue to the switch fabric card 82, and reading a cell from the cell queue according to an arbitration result of the switch fabric card 82 and submits the cell to the switch fabric card 82.

Furthermore, the switch fabric access management module 812 detects a status of a local cell queue, and reports the status of the cell queue once in each time slot to the switch fabric as request information.

Furthermore, the switch fabric card 82 may further include a crossbar 821 and an arbiter 822. The arbiter 822 receives status information of the cell queue, and establishes a matching relationship according to procedures of the methods in the embodiments shown in FIG. 1 to FIG. 3, and then configures a status of the crossbar 821 according to the matching relationship. The crossbar 821 transfers data cell in an input port to a matched output port according to the configured status.

Persons of ordinary skill in the art may understand that all or a part of the steps of the preceding embodiments may be implemented by a program instructing relevant hardware. The program may be stored in a computer readable storage medium. When the program runs, the steps of the method embodiments of the present invention are performed. The storage medium may include any medium that is capable of storing program codes, such as an ROM, an RAM, a magnetic disk, or a compact disk.

Finally, it should be noted that the preceding embodiments are merely used for describing the technical solutions of the present invention, but are not intended to limit the present invention. It should be understood by persons of ordinary skill in the art that although the present invention is described in detail with reference to the preceding embodiments, modifications may still be made to the technical solutions described in each preceding embodiment, or equivalent replacements may still be made to some technical features in the technical solutions, however, these modifications or replacements do not make the essence of the corresponding technical solutions depart from the spirit and scope of the technical solutions in each embodiment of the present invention.

What is claimed is:

1. A method for implementing flow control in a switch fabric, the method comprising:
   sending, by each input port, request information to a destination output port where no packet congestion occurs;
   according to respective back pressure information, determining, by a destination output port which receives the request information, whether to return grant information to each input port to establish a matching relationship between each input port and the destination output port which returns the grant information;
   according to the matching relationship, scheduling, by each input port, a cell to a destination output port that is matched with each input port; and
   wherein sending, by each input port, request information to a destination output port where no packet congestion occurs comprises:
      filtering a destination output port where congestion occurs according to a destination port filtering table of each queue at each input port, the destination port filtering table is used for recording whether packet congestion occurs at a destination output port.

2. The method according to claim 1, wherein determining, by a destination output port which receives the request information, whether to return grant information to each input port to establish a matching relationship between each input port and the destination output port which returns the grant information comprises:
   obtaining, by each output port, a congestion status of the port, wherein after the destination output port receives the request information of the input port, a destination output port where congestion occurs no longer sends grant information to any input port.

3. The method according to claim 2, further comprising:
   if each input port maintains multiple queues, according to an order of cells in a packet, continuously queuing received cells that belong to the same packet in the same queue.

4. The method according to claim 1, wherein scheduling, by each input port, a cell to a destination output port that is matched with each input port comprises:
   sending, by each input port, a multicast cell copy by using a fan-out split method to the destination output port which establishes the matching relationship, updating a destination port table of an HOL cell of a multicast queue, and deleting a destination output port to which a cell copy has been sent;
   if the destination port table of the HOL cell of the multicast queue is empty, deleting, by each input port, the HOL cell of the multicast queue; or
   sending, by each input port, a unicast cell copy to the destination output port which establishes the matching relationship, and deleting an HOL cell of a unicast queue.

5. The method according to claim 4, further comprising:
   if each input port maintains multiple queues, according to an order of cells in a packet, continuously queuing received cells that belong to the same packet in the same queue.

6. The method according to claim 1, further comprising:
   after cell scheduling, if each input port detects that the length of an input queue buffer area exceeds a preset threshold, or a destination port filtering table is not empty, deleting, by each input port, an HOL cell of a queue, and adding residual destination output ports into the destination port filtering table.

7. The method according to claim 6, further comprising:
   if each input port maintains multiple queues, according to an order of cells in a packet, continuously queuing received cells that belong to the same packet in the same queue.

8. The method according to claim 1, further comprising:
   if each input port detects that a deleted HOL cell of a queue is a packet-tail cell, clearing a destination port filtering table of the queue.

9. The method according to claim 8, further comprising:
   if each input port maintains multiple queues, according to an order of cells in a packet, continuously queuing received cells that belong to the same packet in the same queue.

10. The method according to claim 1, further comprising:
if each input port maintains multiple queues, according to an order of cells in a packet, continuously queuing received cells that belong to the same packet in the same queue.

11. The method according to claim 1, further comprising:
if each input port maintains multiple queues, according to an order of cells in a packet, continuously queuing received cells that belong to the same packet in the same queue.

12. A switching device, comprising:
an input port processing module;
an output port processing module;
an arbitration module;
a crossbar module; and wherein
the input port processing module is configured to send request information received from each input port to the arbitration module,
the output port processing module is configured to send back pressure information received from each output port to the arbitration module,
the arbitration module is configured to establish a matching relationship between each input port and the destination output port according to the request information and the back pressure information,
the crossbar module is configured to, according to the matching relationship, schedule a data cell of each input port to the destination output port that is matched with each input port; and
wherein the input port processing module is further configured to obtain a destination output port of a head of line (HOL) cell in each data input queue of each input port, and according to a destination port filtering table of each queue, filter a destination output port where congestion occurs when sending the request information to the destination output port, wherein the destination port filtering table is used for recording whether packet congestion occurs at the destination output port.

13. The device according to claim 12, wherein,
the input port processing module is further configured to clear the destination port filtering table of the queue if it is detected that a deleted HOL cell of the queue is a packet-tail cell; and
if the input port processing module is configured to maintain multiple queues, according to an order of cells in a packet, continuously queue received cells that belong to the same packet in the same queue.

14. The device according to claim 12, wherein,
the input port processing module is further configured to send a multicast cell copy by using a fan-out split method to the destination output port which establishes the matching relationship, update a destination port table of an HOL cell of a multicast queue, delete a destination output port to which a cell copy has been sent, and if the destination port table of the HOL cell of the multicast queue is empty, delete the HOL cell of the multicast queue;
the input port processing module is further configured to delete an HOL cell of a unicast queue after sending a unicast cell copy to the destination output port which establishes the matching relationship.

15. The device according to claim 14, wherein,
the input port processing module is further configured to clear the destination port filtering table of the queue if it is detected that a deleted HOL cell of the queue is a packet-tail cell; and
if the input port processing module is configured to maintain multiple queues, according to an order of cells in a packet, continuously queue received cells that belong to the same packet in the same queue.

16. The device according to claim 12, wherein,
the input port processing module is further configured to: after cell scheduling, if it is detected that the length of an input queue buffer area exceeds a preset threshold, delete an HOL cell of a queue, and add residual destination output ports into the destination port filtering table.

17. The device according to claim 12, wherein,
the input port processing module is further configured to clear the destination port filtering table of the queue if it is detected that a deleted HOL cell of the queue is a packet-tail cell; and
if the input port processing module is configured to maintain multiple queues, according to an order of cells in a packet, continuously queue received cells that belong to the same packet in the same queue.

18. A switching system, comprising:
an uplink queue management device and a downlink queue management device which are configured to schedule a data cell; and
at least one switching device comprising:
an input port processing module,
an output port processing module,
an arbitration module,
a crossbar module,
the uplink queue management device is coupled to the input port processing module, and the downlink queue management device is coupled to the output port processing module,
the input port processing module is configured to send request information received from each input port to the arbitration module,
the output port processing module is configured to send back pressure information received from each output port to the arbitration module,
the arbitration module is configured to establish a matching relationship between each input port and the destination output port according to the request information and the back pressure information, and
the crossbar module is configured to, according to the matching relationship, schedule a data cell of each input port to the destination output port that is matched with each input port, and
wherein the input port processing module is further configured to obtain a destination output port of a head of line (HOL) cell in each data input queue of each input port, and according to a destination port filtering table of each queue, filter a destination output port where congestion occurs when sending the request information to the destination output port, wherein the destination port filtering table is used for recording whether packet congestion occurs at the destination output port.

\* \* \* \* \*